United States Patent [19]
Corbin et al.

[11] Patent Number: 5,734,814
[45] Date of Patent: Mar. 31, 1998

[54] HOST-BASED RAID-5 AND NV-RAM INTEGRATION

[75] Inventors: John R. Corbin, El Paso, Tex.; Robert S. Gittins, Woodland Park, Colo.

[73] Assignee: Sun Microsystems, Inc., Mountain View, Calif.

[21] Appl. No.: 631,934

[22] Filed: Apr. 15, 1996

[51] Int. Cl.[6] .................................................. G06F 11/00
[52] U.S. Cl. ................................. 395/182.04; 395/441
[58] Field of Search ......................... 395/180, 181, 395/182.04, 440, 441, 182.03, 182.05, 185.01, 185.06, 185.07, 427

[56] References Cited

U.S. PATENT DOCUMENTS

| | | | |
|---|---|---|---|
| 5,007,027 | 4/1991 | Shimoi | 365/229 |
| 5,124,987 | 6/1992 | Milligan et al. | 395/182.04 |
| 5,210,866 | 5/1993 | Milligan et al. | 395/182.04 |
| 5,452,444 | 9/1995 | Solomon et al. | 395/182.04 |
| 5,463,765 | 10/1995 | Kakuta et al. | 395/182.04 |
| 5,490,248 | 2/1996 | Dan et al. | 395/182.04 |
| 5,572,660 | 11/1996 | Jones | 395/182.04 |
| 5,586,291 | 12/1996 | Lasker et al. | 395/440 |
| 5,596,709 | 1/1997 | Bond et al. | 395/182.05 |
| 5,617,530 | 4/1997 | Stallmo et al. | 395/182.04 |

FOREIGN PATENT DOCUMENTS 0 569 755 A  11/1993  European Pat. Off. ........ G06F 11/08

OTHER PUBLICATIONS

Computer Architecture News, vol. 21, No. 2, 1 May 1993, pp. 76–86, Jai Menon et al. "The Architecture of A Fault-Tolerant Cached Raid Controller".

Computer Technology Review, vol. 15, No. 6, Jun. 1995, pp. 44, 46–47, Massiglia P., "Write-Back Cache and Raid: Cache and I/O Performance".

*Primary Examiner*—Albert Decady
*Attorney, Agent, or Firm*—William J. Kubida; James A. Pinto; Holland & Hart LLP

[57] ABSTRACT

In a computing system utilizing redundant storage devices arranged in the RAID disk array, data is stored in the computing system using a memory cache created from system memory and the disk array. A checkpoint module detects a fault in the computing system and generates a fault indication, and a cache manager writes data and parity to the memory cache in a first mode, and writes data and parity to the storage device in a second mode. In response to the fault indication, the checkpoint module copies the data contained in the cache to the disk array, and switches the cache manager from the first mode to the second mode.

6 Claims, 7 Drawing Sheets

HOST-BASED RAID-5 AND NV-RAM INTEGRATION

BACKGROUND OF THE INVENTION

1. Field of the Invention

The present invention relates, in general, to the field of computers and computer storage devices. More particularly, the present invention relates to efficient management of a redundant storage device array in a computing system.

2. Description of Prior Art

In computing systems designed for large data processing and data storage applications, redundant storage devices are provided to enhance the integrity of data maintained on the system in the event of a failure of a storage device.

For example, level 5 of RAID (Redundant Array of Inexpensive Disks; RAID-5) is a technology which utilizes an array of disk drives which contain data and parity information distributed, or striped, across each disk in the array. Parity information is additional, non-essential data used to reconstruct data contained on any of the drives of the array in the event of a single drive failure. In this manner, a RAID-5 disk array can improve the data integrity of the computing system by providing for data recovery despite the failure of a single disk drive.

A fundamental requirement of a RAID-5 system is that the data and the parity information must be synchronously maintained at all times in order to avoid data corruption. In other words, a RAID-5 disk array requires that the data and parity maintained within the storage system must be synchronized in order to correctly regenerate the data stored on any failed disk drive.

Maintaining synchronization between data and parity in a RAID-5 system becomes complicated when the RAID-5 system is implemented within a general purpose computing system, also known as a host-based computing system. In a host-based computing system, maintaining synchronization between the data and the parity information becomes more difficult because there are numerous events occurring therein which can potentially interrupt the synchronization between the storage of data and parity information.

In order to write new data to the RAID-5 array, conventional RAID-5 techniques involve numerous disk accesses to read, modify, and write the new data and the new parity to ensure that synchronization is maintained.

Because of the numerous disk accesses required, conventional RAID-5 storage techniques are generally characterized by slow processing times, when compared to non-redundant systems, for storing or writing data in the redundant array of disk drives. A single write of new data to the RAID-5 disk array generally requires six to eight disk input/output operations. Since a single disk input/output operation takes approximately ten milliseconds per operation, a single write of new data to a RAID-5 disk array can conventionally require approximately sixty milliseconds.

Therefore, while a RAID-5 disk array improves the data integrity of the computing system in the event of a single disk failure, the performance of the RAID-5 disk array is very costly in terms of slower processing times.

SUMMARY OF THE INVENTION

In accordance with this invention, the above problems have been solved by a method for writing new data and new parity in a computing system having a system memory, an array of drives arranged in a RAID configuration, and a backup power module. A cache for storing parity and data information is established and maintained in the system memory of the host. By using the cache, the performance of the computing system in implementing a write of new data to the RAID disk array is substantially improved.

Specifically, the new parity and new data is calculated from the old parity and old data stored in the computing system. After the new parity is calculated, the new data is transferred to the cache for storage, and the new parity is transferred to the cache for storage. The computing system now has a stable version of the new data and the new parity.

The new data is then written to disk, and the new parity is written to the cache. Finally, the new parity transferred in the cache and the new data transferred to the cache are then marked as invalid.

System conditions of the computing system are monitored and if a fault is detected, the cache is disabled, and all data RAID-5 operations are performed using the disk only. The contents of the cache, along with a corresponding checksum, are copied to the drives so that the cache information can be used for data or parity reconstruction.

The above computer implemented steps in another implementation of the invention are provided as an article of manufacture, i.e., a computer storage medium containing a computer program of instructions for performing the above described steps.

In a machine implementation of the invention, an apparatus for storing data to a storage device configured as a RAID disk array in a computer, where the computer has a processor, an input/output device, a system memory, and a backup power supply for supplying power to the computing system. The apparatus comprises a memory cache, a checkpoint module, and a cache manager.

The memory cache, resident in the system memory, stores data. A checkpoint module detects a fault in the computing system and generating a fault indicator. The faults detected include a failure of software, a disturbance in the system's power supply, or a hardware fault.

A cache manager writes data and parity to the memory cache in a first mode, and writes data and parity to the storage device in a second mode. In response to the fault indication, the checkpoint module generating a checksum of data contained in the cache, copying the data contained in the cache to the storage device, and switching the cache manager from the first mode to the second mode.

The great utility of the present invention is to substantially reduce the number of required accesses to a physical disk drive during a write operation to a RAID-5 disk array, thereby improving the performance of the computing system by reducing the time required to perform a single write operation.

Still another utility of the present invention is to maintain synchronization between the data and the parity information contained within the storage devices of the computing system.

Still another utility of the present invention is to provide synchronization between data and parity information in a host based implementation of a RAID-5 disk array.

Still another utility of the present invention is to provide recovery of data contained within a single disk drive which fails.

Still another utility of the present invention is to permit recovery of data or parity information after a single failure of other non-disk drive components of the computing system, such as a software failure or a CPU module failure.

3

The foregoing and other useful features and advantages of the invention will be apparent from the following more particular description of a preferred embodiment of the invention as illustrated in the accompanying drawings.

DETAILED DESCRIPTION OF PREFERRED EMBODIMENTS

The embodiments of the invention described herein are implemented as logical operations in a computing system. The logical operations of the present invention are implemented (1) as a sequence of computer implemented steps running on the computing system and (2) as interconnected machine modules within the computing system. The implementation is a matter of choice dependent on the performance requirements of the computing system implementing the invention. Accordingly, the logical operations making up the embodiments of the invention described herein are referred to variously as operations, steps, or modules.

Figure 1:
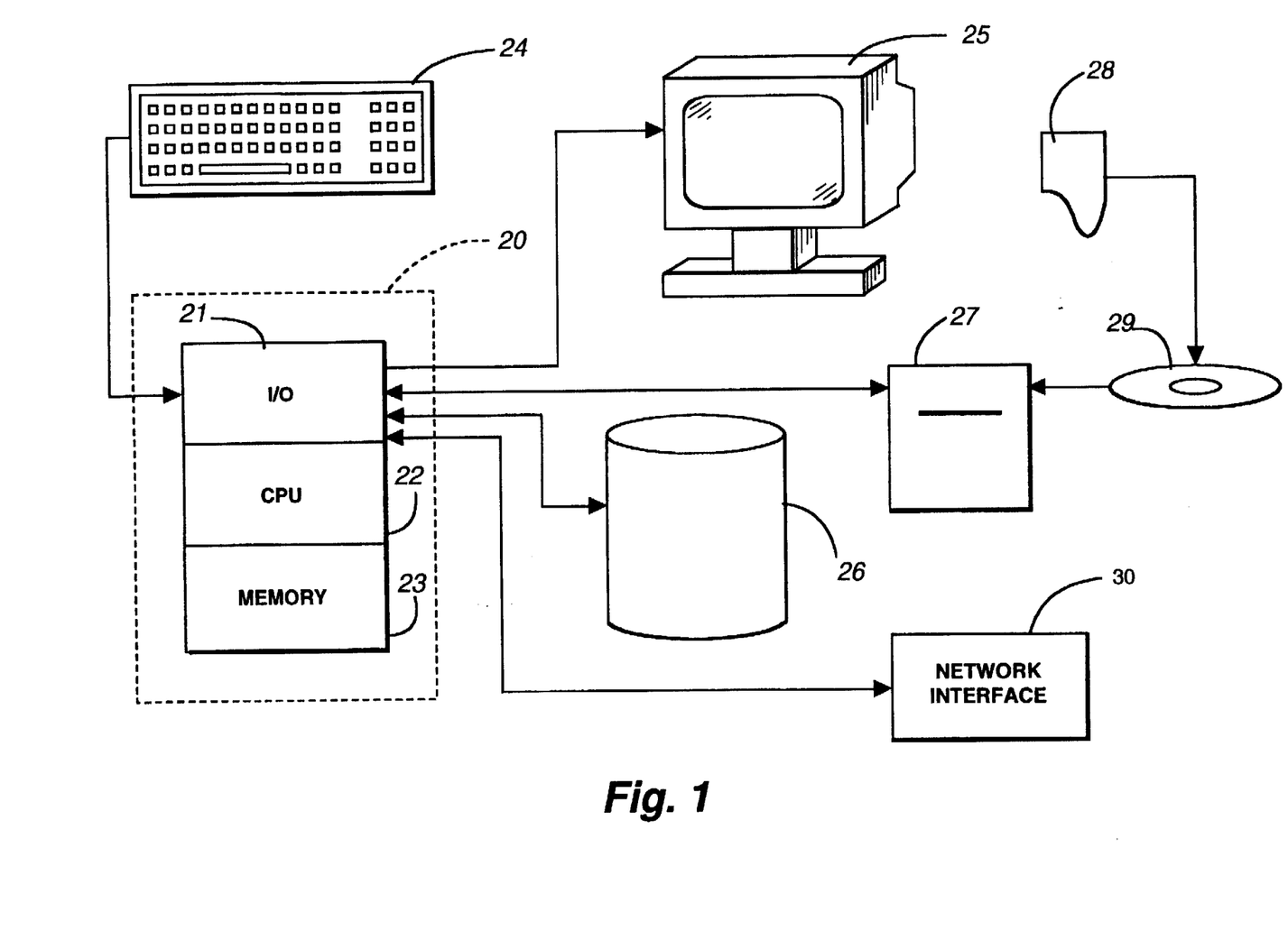
FIG. 1 illustrates a computing system to perform the computer implemented steps in accordance with the invention.

The operating environment, in which the present invention is used, encompasses a stand alone computing system as well as the general distributed computing system. In the distributed computing system general purpose computers, workstations, or personal computers are connected via communication links of various types, in a client-server arrangement, wherein programs and data, many in the form of objects, are made available by various members of the system. Some of the elements of a stand alone computer or a general purpose workstation computer are shown in FIG. 1, wherein a processor 20 is shown, having an input/output (I/O) section 21, a central processing unit (CPU) 22 and a memory section 23. The I/O section 21 is connected to a keyboard 24, a display unit 25, a disk storage unit 26, network interface 30, and a CD-ROM drive unit 27. The CD-ROM unit 27 can read a CD-ROM medium 29 which typically contains programs 28 and data. The computer program products containing mechanisms to effectuate the apparatus, and methods of the present invention may reside in the memory section 23, or on a disk storage unit 26, or on the CD-ROM 29 of such a system. Examples of such systems include SPARC systems offered by Sun Microsystems, Inc., personal computers offered by IBM Corporation and by other manufacturers of IBM-compatible personal computers, and systems running the UNIX operating system or Solaris™ operating system.

Figure 2:
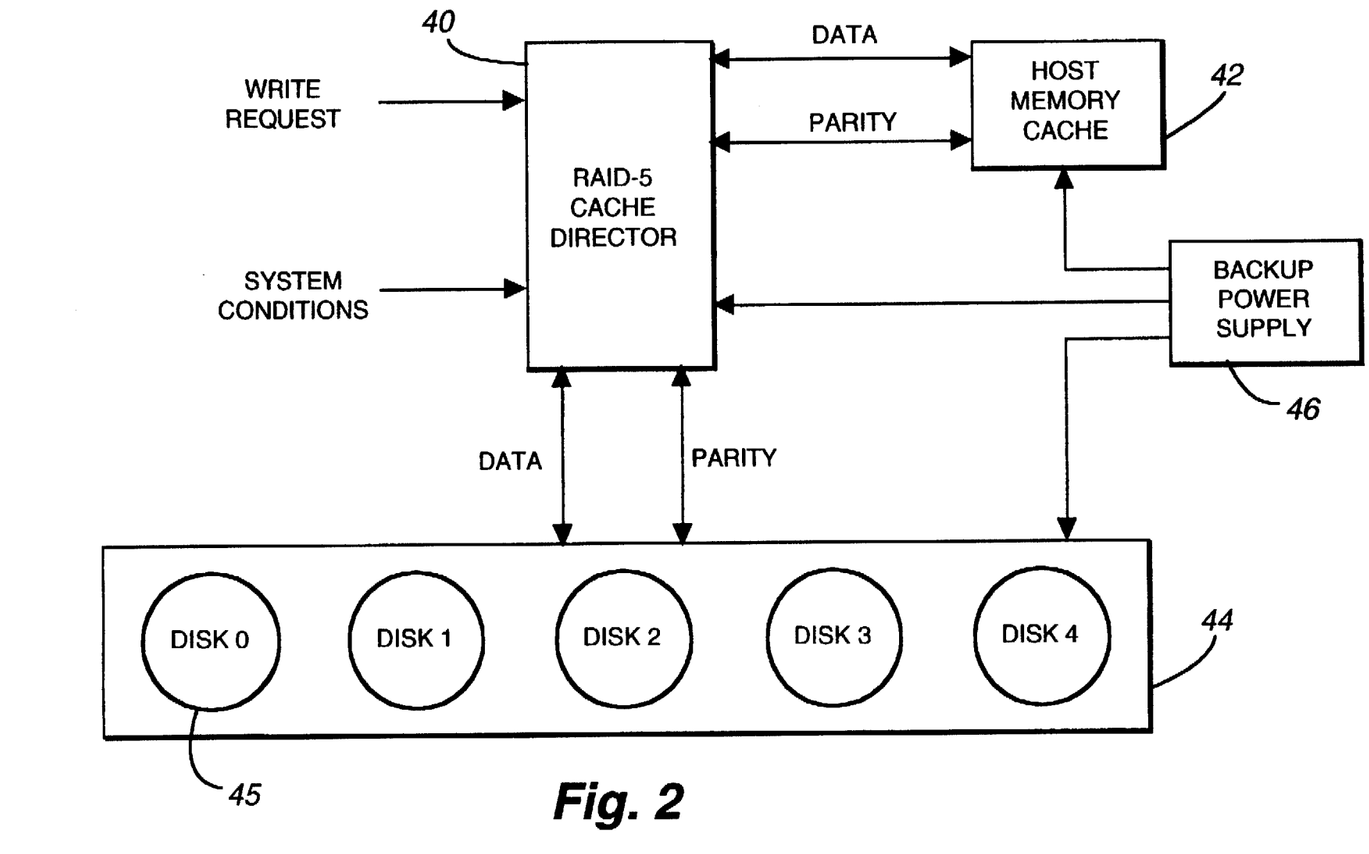
FIG. 2 illustrates a block diagram of the preferred embodiment of the present invention.

FIG. 2 illustrates a block diagram of the preferred embodiment of the present invention. RAID-5 cache director 40 receives requests from the computing system to write new data to the array of disks 44. In FIG. 2, individual disks 45 are arranged in a RAID-5 disk array 44. From the perspective of the computing system, the disk array 44 appears as a single logical disk drive, although it is physically implemented as a plurality of disk drives in a RAID-5 array.

The operations of RAID-5 disk arrays are described in detail in the publication *RAID: High Performance, Reliable Secondary Storage*, by Peter Chen, et. al., published in ACM Computing Surveys, Oct. 29, 1993.

RAID-5 cache director 40 implements operations to efficiently utilize the host memory cache 42 and the disk array 44. As will be described in detail below, RAID-5 cache director 40, responsive to a request to write new data, utilizes host cache memory 42 in order to reduce the number of operations involving the array of disk drives 44.

The RAID-5 cache director 40 also monitors system conditions in order to determine if cache 42 should be disabled. Backup power supply 46 provides uninterruptable power to the computing system including cache director 40, cache 42, and the array of disk drives 44.

Host memory cache 42 is a cache which is created from the system memory of the host, typically in system RAM. Cache 42 can be permanently allocated from and reserved in the system memory of the host. By reserving a portion of system memory for cache 42, no other applications or devices can disturb the contents maintained in the memory space reserved for cache 42.

Cache 42 is stably maintained in traditional system RAM of the host through the use of a system backup power supply 46. In this manner, the contents of the cache could be copied to the array of disks, as will be explained below. The memory utilized for cache 42 is a matter of choice depending upon the system in which the preferred embodiment of the present invention is utilized.

The operation of RAID-5 cache director 40 in conjunction with cache 42, the array of disks 44, and backup power supply 46 are illustrated in FIGS. 3, 4, 6A, and 6B.

Figure 3:
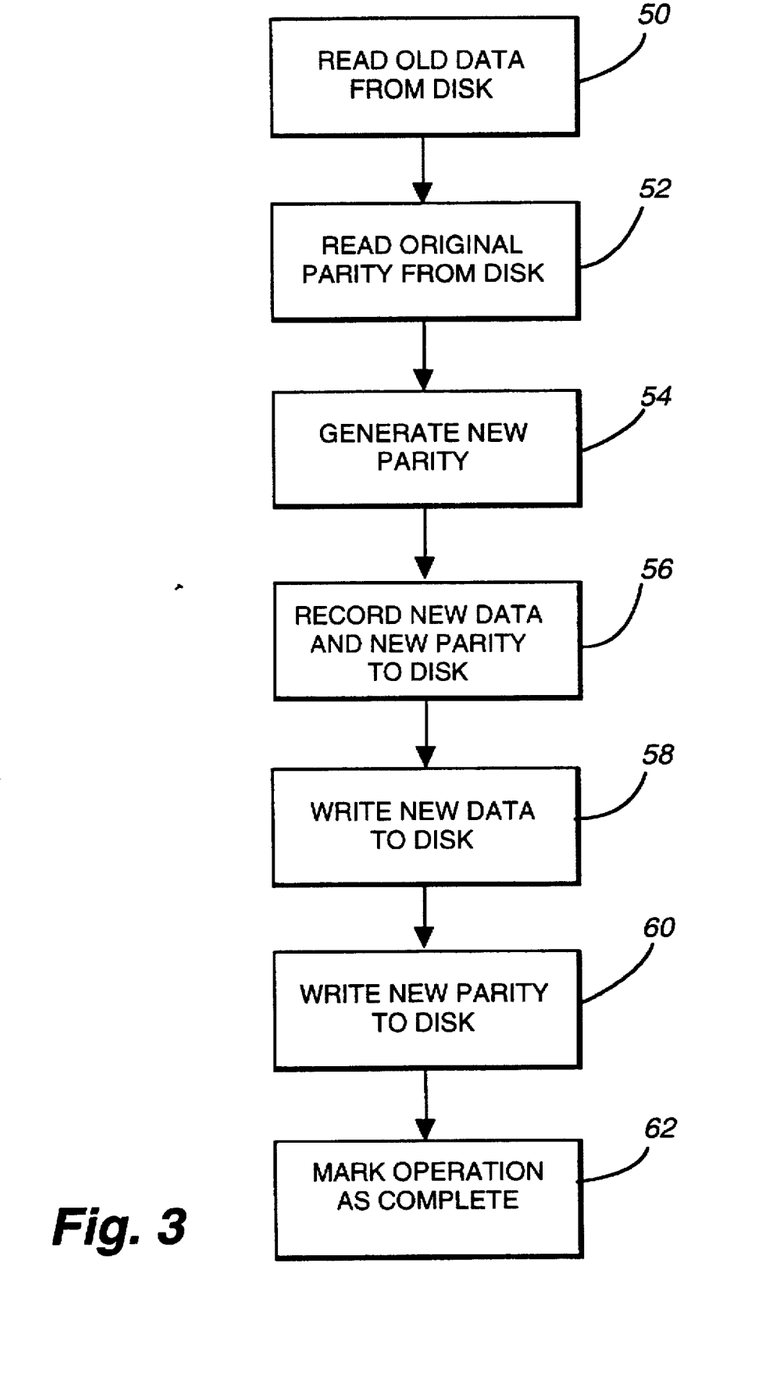
FIG. 3 illustrates the logical operations performed to write new data in a RAID-5 disk array.

FIG. 3 illustrates the logical operations performed by cache director 40 to write, without caching, new data to disk array 44. Operation 50 reads the old data from the disk, while operation 52 reads the old parity from the disk. Operations 50 and 52 are needed to calculate the new parity information. Operation 54 generates the new parity information by first removing the old data from the parity information. Removing the old data from the parity can be achieved through an exclusive-OR operation. The new parity information is then generated by including the new data into the parity information, which can also be achieved using an exclusive-OR calculation.

Having calculated the new parity information corresponding to the new data, it is advantageous, in order to maintain synchronization, to record the new data and the new parity in the disk before writing the new data and the new parity to its final location on the disk. In this manner, if the computing system is interrupted or if a device fails before the new data and new parity are written to the disk, the information is synchronized. As previously explained, synchronization between data and parity is needed to reconstruct data stored on a failed disk drive. Operation 56 records the new data to the disk, and then records the new parity information to the disk. This information is recorded to the disk in a known location so that if the system crashes before, during, or after operation 56, the computing system can access the known location of this information in order to reconstruct, if necessary, any data.

Having permanently recorded the new data and new parity, this information can now be transferred to their respective storage locations on the disk drives. Operation 58 writes the new data to the disk, and operation 60 writes the new parity information to the disk. In this manner, both the new data and the new parity are now synchronously maintained on the disk drive.

Having completed the write of the new data and the new parity to the disk, operation 62 marks the entire write operation as complete. By marking the operation completed, the application requesting the write operation can then continue with its next desired operation. Furthermore, by marking the operation complete, the system is made aware that the data and the parity recorded by operation 56 can be discarded or overwritten. If a disk drive in the system should fail, the parity information written by operation 60 can be used to regenerate the data contained on the failed disk drive.

Figure 4:
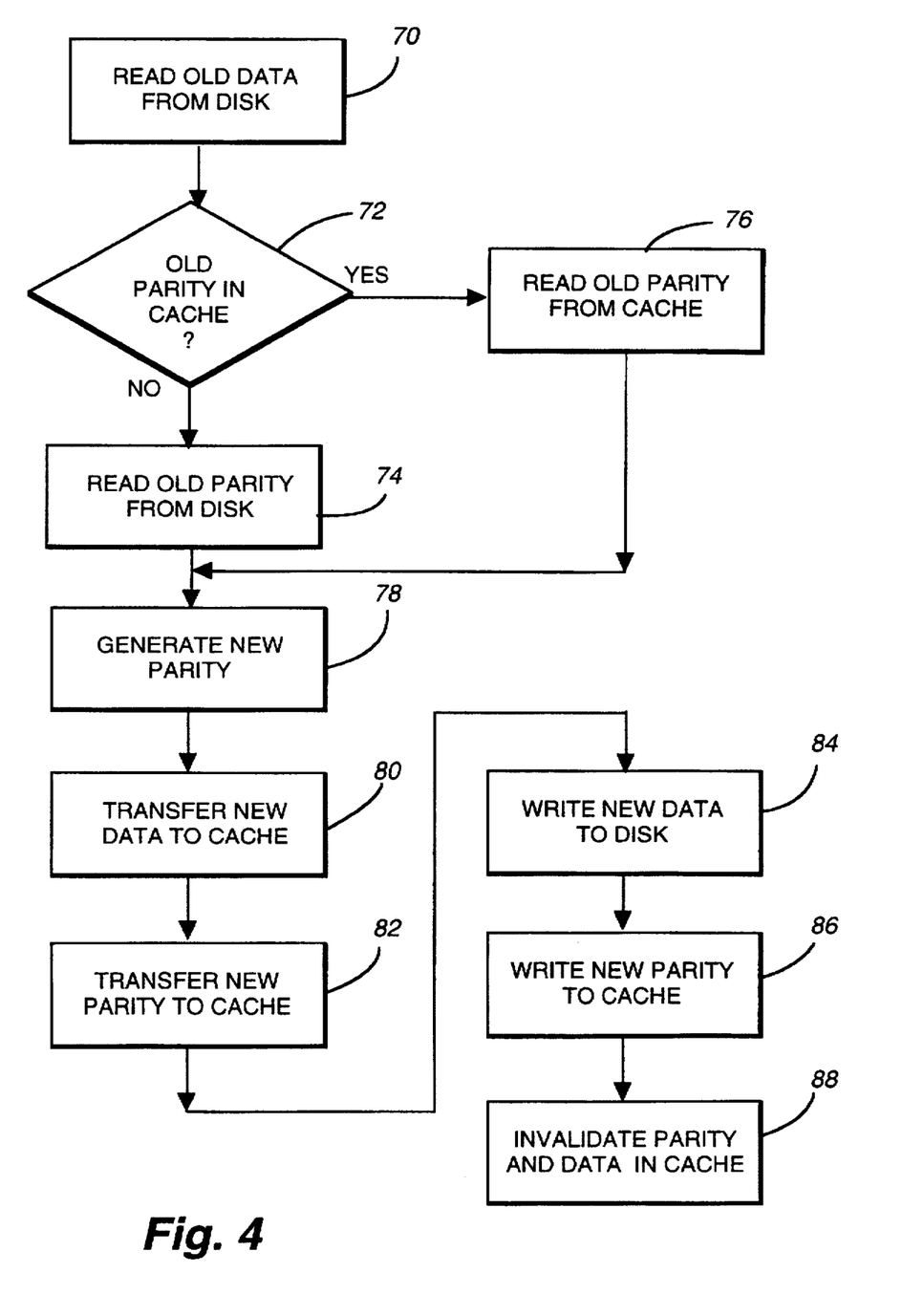
FIG. 4 illustrates the logical operations of to write new data to the RAID-5 disk array using a memory cache.

FIG. 4 illustrates the logical operations performed to write new data, using host memory cache 42 (FIG. 2), along with disk array 44. When the RAID-5 cache director utilizes memory cache 42, substantial reductions in processing time are realized because the memory cache has a substantially shorter response time than do the physical disks 45 of the disk array 44.

Responsive to a request to write new data to the disk array 44, operation 70 reads the old data from the disk. In order to read the old parity so that the new parity can be calculated, operation 72 determines if the old parity exists in the cache. If the old parity is not stored in the cache, operation 74 reads the old parity from the disk. Otherwise, operation 76 reads the old parity from the cache 42 (FIG. 2). As previously discussed, reading or writing data from the memory cache is substantially faster than reading or writing data from the physical disk drive.

After the old parity is fetched, operation 78 generates the new parity using the old data, old parity, and new data, as explained in operation 54 of FIG. 3.

Again, it is advantageous to store the new data and the new parity into a permanent location prior to writing this information to the final locations on the disk. RAID-5 cache director 40 (FIG. 2) again utilizes host memory cache 42 in order to enhance the speed performance of these operations.

Operation 80 transfers the new data to the memory cache. Operation 82 then transfers the new parity information to the memory cache. There are a variety of cache implementations available. For instance, a least recently used (LRU) link list can be used to organize the data and parity information stored in the cache. As will be explained below, the contents of the cache can be overwritten by a subsequent write operation only after the contents of the cache have been successfully transferred to disk.

Having stored the new data and new parity in the cache, operation 84 writes the new data to the disk at its appropriate storage location. Operation 86 then writes the new parity information to the cache. Operation 86 utilizes a different storage region in the cache than operation 82 for maintaining the new parity information. At the completion of operation 86, both the new data and the new parity have been stored consistently so that synchronization is maintained.

Operation 88 then invalidates the data and the parity stored in the cache corresponding to operations 80 and 82. In this manner, this information is marked as no longer being usable for data recovery purposes. In this manner, the memory occupied by the information stored in the cache through operations 80 and 82 can be utilized by subsequent write operations executed in the computing system. It should be noted that the new parity information stored in the cache by operation 86 is unaffected by the invalidation operation 88, because operation 86 utilized a different area of the cache than operations 80 and 82.

Because the operations of FIG. 4 utilize the memory cache 42 (FIG. 2), the overall time required to complete operations 70–88 of FIG. 4 is substantially shorter than the time required to complete operations 50–62 of FIG. 3. As will be described below, the decision to utilize memory cache 42 is made by RAID-5 cache director 40 based on the system conditions (FIG. 2).

The cache (FIGS. 2 and 5) can be periodically "pruned" so that the oldest parity stored in the cache by operation 86 (FIG. 4) is moved to persistent storage in the disk array 44. A separate process (not shown) could perform this function when appropriate.

Figure 5:
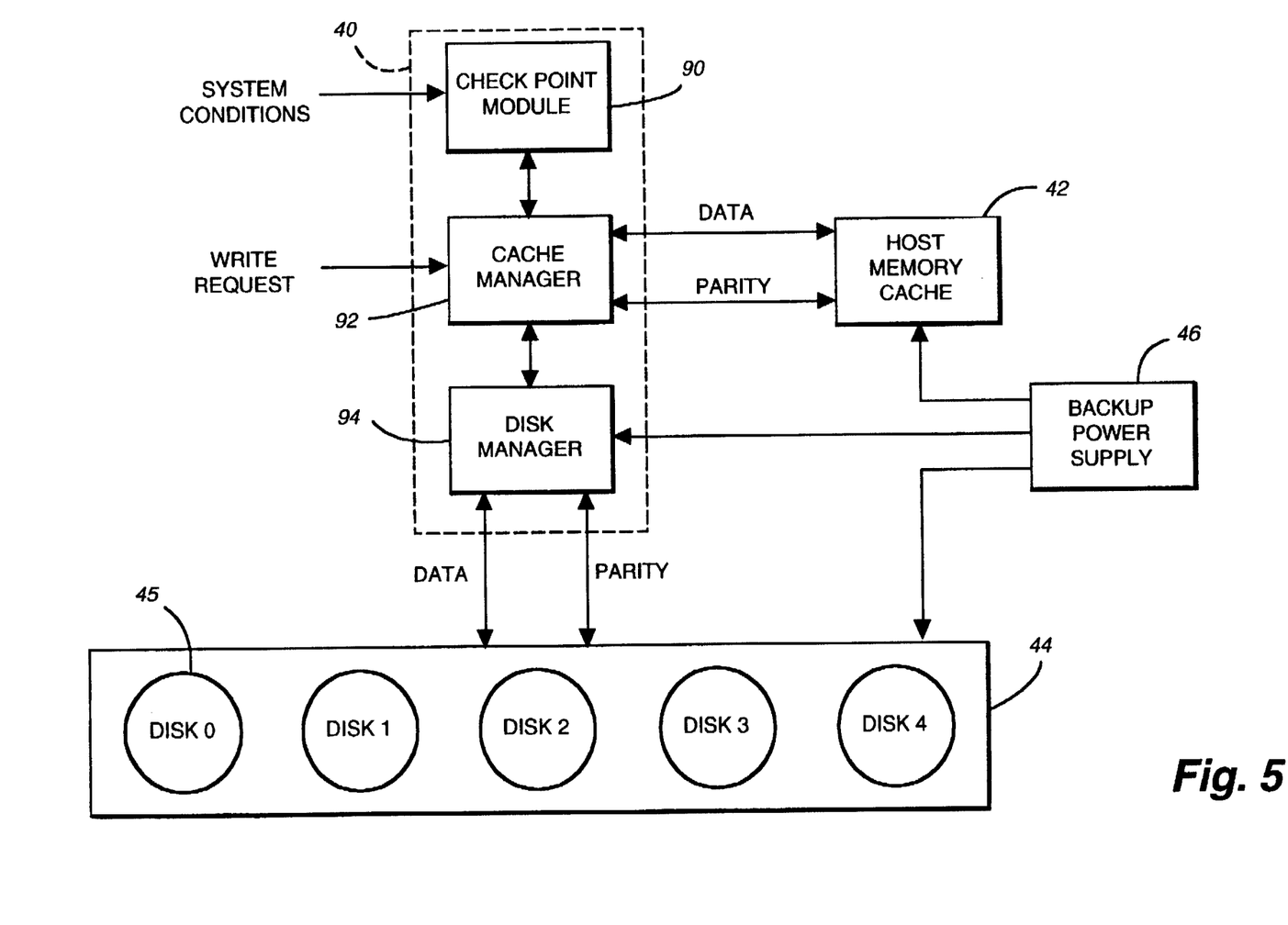
FIG. 5 illustrates an alternative embodiment of the cache director of FIG. 2.

FIG. 5 illustrates an alternative embodiment of the present invention. Checkpoint module 90, cache manager 92, and disk manager 94 are separate components which can comprise RAID-5 cache director 40. Checkpoint module 90 monitors system conditions and issues commands to cache manager 92. Cache manager 92, responsive to a request to write new data, utilizes host memory cache 42 and disk manager 94 to write data and parity either to the cache 42 or the array of disks 44, or both.

Backup power supply 46 provides uninterruptable power for the entire computing system including cache 42, disk array 44, checkpoint module 90, cache manager 92, and disk manager 94.

Figure 6A:
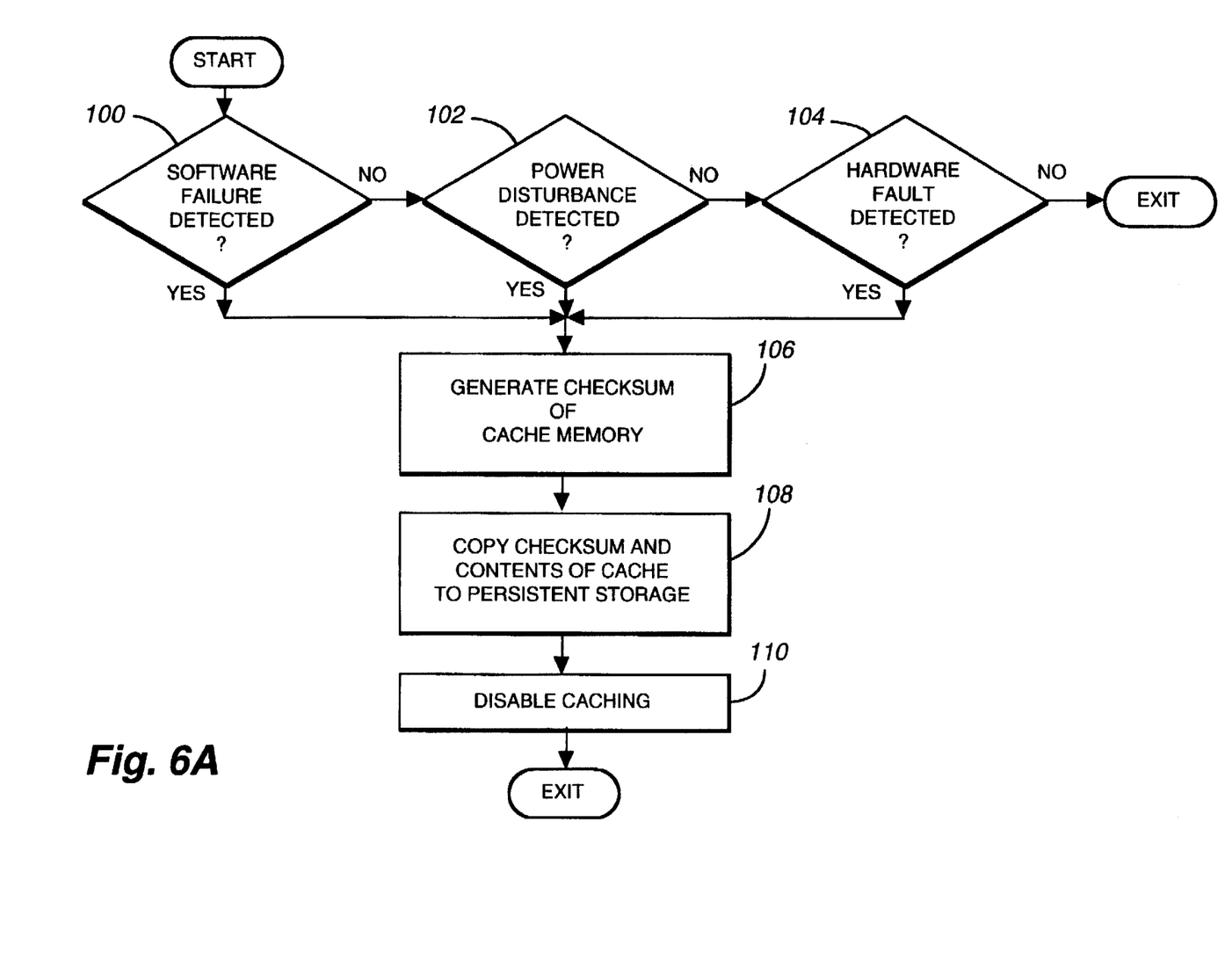
FIGS. 6A and 6B illustrate the logical operations to determine if the memory cache should be enabled or disabled.

FIG. 6A illustrates the logical operations performed by checkpoint module 90. Checkpoint module 90 is designed to detect changes in system conditions which would require that the contents of host memory cache 42 be transferred to persistent storage in disk array 44. Furthermore, checkpoint module 90 determines whether caching of data and parity should be enabled or disabled based on system conditions.

Operation 100 determines if a software failure has occurred within the computing system. Operation 102 determines whether a disturbance in the power supply of the system has occurred. Operation 104 determines if any hardware faults have been detected. If any of the conditions tested in operation 100, 102, or 104 are true, then operation 106 generates a checksum of the contents of cache memory 42. Operation 108 then copies the contents of the cache, along with the checksum, to the disk array 44 (FIG. 5) for persistent storage. Operation 110 then disables caching in the RAID-5 cache director so that the memory cache, which may be volatile due to the conditions detected at operations 100, 102, or 104, is not used. Therefore, the RAID-5 cache director would satisfy write requests by utilizing the operations previously discussed and shown in FIG. 3.

Figure 6B:
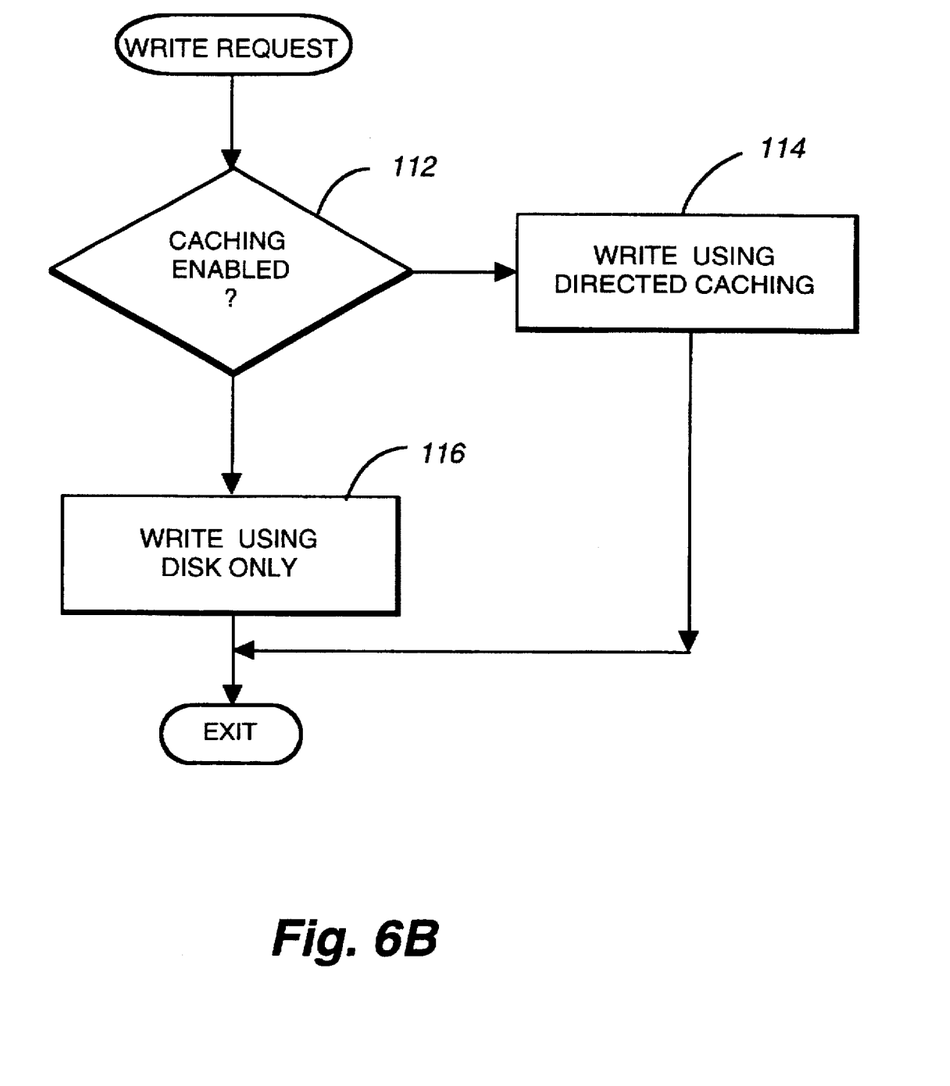

As system conditions are monitored according to FIG. 6A, FIG. 6B illustrates the corresponding operations implemented in the RAID-5 cache director 40. Operation 112 determines if caching has been enabled, and if so, operation 114 uses the memory cache 42 (FIGS. 2 and 5) to satisfy write requests in the computing system. Operation 114 would invoke the operations 70–88 of FIG. 4, previously described, to reduce the time to complete a write of data to the RAID-5 disk array 44 (FIGS. 2 and 5).

If caching is disabled as detected at operation 112, then operation 116 satisfies the write operation by invoking the operations 50–62 of FIG. 3, as previously described. The write operations would be performed using the RAID-5 disk array 44 (FIGS. 2 and 5) exclusively.

In the event of a single disk failure in the computing system, the data stored on the failed disk can be reconstructed because the operations of FIG. 3 and FIG. 4 have maintained consistency of and synchronization between the data and the parity.

Furthermore, data or parity information can be recovered after a single failure in a non-disk drive component of the computing system (i.e., software error, CPU module failure). Assuming these failures require that the system be rebooted and the failed component is replaced, upon reboot the disk drive which would contain the cache, in accordance with operation 108 of FIG. 6A, is read to determine if the cache was saved by the checkpoint module 90 (FIG. 5, 6A). If the cache was saved to the disk drive, then the contents of the cache can be used for data recovery as previously described. If the cache was not saved, as in the case of a major hardware error such as a CPU module failure, then the parity information can be regenerated from the data stored on the array of drives 44 (FIGS. 2, 5). While regeneration of parity from the data stored in the drive array is a lengthy process, the parity information in the computing system can be restored.

Therefore, the present invention provides for a host based implementation of RAID-5, using a memory cache maintained in the host memory, to substantially reduce the amount of time required by the computing system to satisfy a request to write new data. The integrity of the RAID-5 information maintained in the system is achieved through the use of an uninterruptable power supply in conjunction with a check point module which monitors system conditions.

While the invention has been particularly shown and described with reference to preferred embodiments thereof, it will be understood by those skilled in the art that various other changes in the form and details made by made therein without departing from the spirit and scope of the invention.

What is claimed is:

1. In a computer having a processor, an input/output device, a system memory, a backup power supply for supplying power to the computing system, and a storage device configured as a RAID disk array, an apparatus for storing data to the storage device, said apparatus comprising:

a memory cache storing data, said memory cache resident in the system memory of the computing system;

a checkpoint module detecting a fault in the computing system and generating a fault indication;

a cache manager operable between a first mode and a second mode, in said first mode said cache manager writing data and parity to said memory cache for temporary storage prior to writing said data and parity to said storage device, and in said second mode said cache manager writing data and parity to a temporary location in said storage device for temporary storage prior to writing said data and parity to said storage device;

in response to the fault indication, said checkpoint module switching said cache manager from the first mode to the second mode.

2. The apparatus of claim 1, wherein the fault detected by said checkpoint module includes a failure of software, a disturbance of power, or a hardware fault.

3. A method for writing new data and new parity in a computing system having a system memory, and an array of drives arranged in a RAID configuration, the method comprising the computer implemented steps of:

providing a backup power module for supplying power to the computing system in the event of a power disturbance;

providing a cache in the system memory for storing parity and data information;

calculating the new parity and new data from old parity and old data stored in the computing system;

transferring the new data to the cache for storage therein;

transferring the new parity to the cache for storage therein at a first location within said cache;

writing the new data to the disk;

writing the new parity to the cache at a second location within said cache;

invalidating the new parity at the first location and new data stored in the cache, and detecting if the cache should be disabled based on an operating condition of the computing system.

4. The method of claim 3, wherein the detecting step further comprises the steps of:

generating a checksum of the contents of the cache;

storing the contents of the cache to at least one drive of said array of drives; and disabling use of the cache for data storage responsive to said detecting step.

5. A computer program storage medium readable by a computing system and encoding a computer program of instructions for executing a computer process for writing new data and new parity in a computing system having a system memory, an array of drives arranged in a RAID configuration, and a backup power module for supplying power to the computing system, said computer process comprising the steps of:

providing a cache in the system memory for storing parity and data information;

calculating the new parity and new data from old parity and old data stored in the computing system;

transferring the new data to the cache for storage therein;

transferring the new parity to the cache for storage therein at a first location within said cache;

writing the new data to the disk;

writing the new parity to the cache at a second location within said cache; and invalidating the new parity at the first location and new data stored in the cache.

6. The computer program storage medium of claim 5 where the computer process further comprises the steps of:

generating a checksum of the contents of the cache;

storing the contents of the cache to at least one drive of said array of drives; and disabling use of the cache for data storage responsive to said detecting step.

* * * * *